United States Patent [19]

Inoue et al.

[11] Patent Number: 5,091,346
[45] Date of Patent: Feb. 25, 1992

[54] COMPOSITION FOR PRODUCING CERAMICS

[75] Inventors: Hiroshi Inoue, Iwakuni; Chikara Igarashi, Ohtake; Takeshi Muranaka, Iwakuni, all of Japan

[73] Assignee: Mitsui Petrochemical Industries, Ltd., Tokyo, Japan

[21] Appl. No.: 251,380

[22] PCT Filed: Jan. 16, 1987

[86] PCT No.: PCT/JP87/00022
§ 371 Date: Sep. 15, 1988
§ 102(e) Date: Sep. 15, 1988

[87] PCT Pub. No.: WO88/05426
PCT Pub. Date: Jul. 28, 1988

[51] Int. Cl.$^5$ .................. C04B 35/56; C04B 35/58
[52] U.S. Cl. .................................. 501/93; 501/81; 501/88; 501/91; 501/92; 501/96
[58] Field of Search ............. 501/93, 94, 96, 87, 501/88, 89, 90, 91, 92, 153; 264/63

[56] References Cited

U.S. PATENT DOCUMENTS

| | | | |
|---|---|---|---|
| 2,929,126 | 3/1960 | Bollack et al. | 264/63 |
| 4,144,207 | 3/1979 | Ohnsorg | 501/90 |
| 4,225,345 | 9/1980 | Adee et al. | 264/63 |
| 4,233,077 | 11/1980 | Hazel | 264/63 |
| 4,710,227 | 12/1987 | Harley et al. | 264/63 |
| 4,784,812 | 11/1988 | Saitoh et al. | 264/63 |
| 4,814,370 | 3/1989 | Kramer et al. | 524/391 |

FOREIGN PATENT DOCUMENTS

| | | | |
|---|---|---|---|
| 0208177 | 12/1983 | Japan | 501/87 |
| 0203761 | 11/1984 | Japan | 501/87 |
| 0223266 | 12/1984 | Japan | 501/87 |
| 1006172 | 1/1986 | Japan | 501/87 |
| 62021753 | 3/1987 | Japan . | |

*Primary Examiner*—William R. Dixon, Jr.
*Assistant Examiner*—Sue Hollenbeck

[57] ABSTRACT

A ceramic-making composition comprising at least one starting powder selected from the group consisting of powders of metals, powders of metal oxides, powders of metal carbides, powders of metal nitrides and powders of metal borides, and a synthetic resin binder. To enhance plastic moldability such as injection moldability and extrusion moldability and facilitate dewaxing, a polyalkylene carbonate is used as the synthetic resin binder.

12 Claims, No Drawings

COMPOSITION FOR PRODUCING CERAMICS

TECHNOLOGICAL FIELD

This invention relates to a starting composition for producing ceramics having high performance, and particularly to a ceramic-making composition suitable for plastic forming processes such as injection molding or extrusion.

BACKGROUND TECHNOLOGY

Various techniques for production of ceramics have been proposed previously. In particular, an injection molding process has attracted attention in recent years which can produce great quantities of molded articles of complex shapes. Specifically, the injection molding process comprises molding a ceramic-making material into a desired shape by an injection molding machine, heating the resulting molded article to decompose and volatilize (dewaxing) components of the material other than a ceramic powder or a metal powder, and sintering the molded article to form a ceramic. The ceramic-making material used at this time is obtained by mixing the ceramic powder and/or the metal powder with a binder and as required, a lubricant, etc. The binder is of particular importance and imparts strength to the molded articles obtained by injection molding. It is generally classified into water-soluble binders and synthetic resin binders.

The water-soluble binders, such as polyvinyl alcohol, polyvinyl butyral, polyethylene glycol, methyl cellulose, carboxymethyl cellulose, ethyl cellulose and hydroxypropyl cellulose, have a lower viscosity than the synthetic resin binders and penetrate well among the ceramic particles. But since they have poor lubricity, they are, in practice, diluted with water to impart lubricity. The strength of a molded article obtained by injection molding using the water-soluble binders is gradually exhibited as water is evaporated, and immediately after molding, the molded article has a very weak strength and is liable to undergo deformation. There may be a means of increasing the strength by decreasing the amount of the diluting water. However, since the flowability of the molding material is reduced, the injecting pressure of the injection molding machine increases or the ceramic powder causes wear and contamination of the molding machine. It is difficult actually to put such means into practice.

The synthetic resin binders, on the other hand, are better than the water-soluble binders in regard to imparting of strength, and are frequently used in injection molding.

Use of the synthetic resin binders in the production of ceramics is disclosed, for example, in U.S. Pat. Nos. 2,446,872, 2,593,943; 2,593,507; and 3,125,618.

U.S. Pat. No. 2,446,872 discloses a process for producing a ceramic product by using ethyl cellulose and shellac as binders.

U.S. Pat. Nos. 2,593,943 and 2,593,507 disclose processes for producing powdery products using polymonolefin thermoplastic resins such as polybutene.

U.S. Pat. No. 3,125,618 discloses a process for producing a powdery ceramic composition containing a resinous binder and consisting essentially of a homopolymer or copolymer of acrylic or methacrylic acid or its ester or amide.

However, all the processes disclosed in the specifications of the above U.S. Patents are disadvantageous in regard to decomposability and volatilizability at low temperatures and the appearance of the molded article after dewaxing. Thus, where a synthetic resin binder is used, the molded article is heated to a very high temperature to decompose the binder and at the same time the temperature slowly raised in order to promote dewaxing ability. Consequently, the time spent for the dewaxing step exceeds 100 hours, and sometime reaches as long as 300 hours.

None of the U.S. Patent specifications mentioned above disclose a ceramic-making composition containing a polyalkylene carbonate as the synthetic resin binder.

DISCLOSURE OF THE INVENTION

Problem Sought to be Solved by the Invention

The present inventors extensively made investigations on a binder which completely decomposes and volatilizes rapidly at relatively low temperatures irrespective of whether in an oxidizing atmosphere or in a non-oxidizing atmosphere and which has good dewaxing ability. These investigations have led to the accomplishment of the present invention.

Means for Solving the Problem

The present invention is a ceramic-making composition comprising a ceramic powder and/or a metal powder and a polyalkylene carbonate.

Action

The polyalkylene carbonate in this invention serves as a binder for the ceramic powder. As surprising properties of the polyalkylene carbonate, it is firstly pointed out that it has excellent affinity for the ceramic powder or the metallic powder and consequently has good kneadability with the ceramic powder mixed in a large amount, and that since the resulting composition does not entrap air, etc. which lead to the occurrence of spaces, no foaming occurs during dewaxing and the resulting ceramic does not have a lowered density. A second surprising property is that the polyalkylene carbonate has excellent thermal decomposability. More specifically, it thermally decomposes rapidly at low temperatures whether in an oxidizing atmosphere (such as air) or in a non-oxidizing atmosphere (such as nitrogen). This property is exhibited even if it is in the form of a composition with a ceramic powder or a metal powder. These properties are not observed in aromatic polycarbonates, which fall within polycarbonates.

The polyalkylene carbonate is obtained by copolymerizing at least one alkylene oxide such as ethylene oxide, propylene oxide, butene oxide and cyclohexene oxide with carbon dioxide ($CO_2$) using an organozinc-type catalyst. The resulting copolymer is a linear polymer, but sometimes contains the alkylene groups and the carbonate groups alternately, or chains of the alkylene groups formed through ether linkages. It would be obvious to those skilled in the art that the copolymer may optionally be modified with an unsaturated carboxylic acid or the like. It has a number average molecular weight Mn of usually 10,000 to 100,000, and in many cases, about 20,000 to 50,000. In the present invention, any polyalkylene carbonates may basically be used, but those in which the alkylene groups have about 2 to 6 carbon atoms are preferred. Specifically, polyethylene carbonate and polypropylene carbonate are preferred.

In the present invention various known types of the ceramic powder or the metal powder (starting powder) may be used and no particular restriction is imposed. Specifically, the following materials may be cited as examples.

(1) Metal powder

Specific examples include powders of aluminum, silicon, scandium, yttrium, lanthanide, actinide, titanium, zirconium, hafnium, thorium, vanadium, niobium, tantalum, chromium, molybdenum, tungsten, manganese, technetium, rhenium, cobalt, nickel, ruthenium, rhodium, palladium, osmium, iridium, platinum, copper, silver, gold, zinc, cadmium, thallium, germanium, tin, lead, arsenic, antimony, bismuth, tellurium, and polonium.

(2) Metal oxides

Specific examples include oxides of the above metals; beryllium oxide, magnesium oxide, calcium oxide, strontium oxide, barium oxide, lanthanum oxide, gallium oxide, indium oxide and selenium oxide; and oxides containing a multiplicity of metallic elements, for example oxides of the perovskite structure such as $NaNbO_3$, $SrZrO_3$, $PbZrO_3$, $BrZrO_3$, $BrTiO_3$, $PbTiO_3$, $AgTaO_3$, $BaTiO_3$ and $LaAlO_3$, oxides of the spinel structure such as $MgAl_2O_4$, $ZnAl_2O_4$, $CoAl_2O_4$, $NiAl_2O_4$, $NiCr_2O_4$, $FeCr_2O_4$, $MgFe_2O_4$, $Fe_2O_4$ $ZnFe_2O_4$ oxides of the ilmenite structure such as $MgTiO_3$, $MnTiO_3$, $FeTiO_3$, $CoTiO_3$, $NiTiO_3$, $LiNbO_3$ and $LiTaO_3$, and oxides of the garnet structure such as $Gd_3GaO_{18}$ and $Y_3Fe_5O_8$.

(3) Specific examples are silicon carbide, titanium carbide, tantalum carbide, chromium carbide, molybdenum carbide, hafnium carbide, zirconium carbide and boron carbide.

(4) Metal nitrides

Specific examples include silicon nitride, aluminum nitride, boron nitride and titanium nitride.

(5) Metal borides

Specific examples are titanium boride, zirconium boride and lanthanum boride.

(6) Surface-modified products of (1) to (5) above

Products obtained by treating (1) to (5) with coupling agents, surface-active agents, polymerizable monomers, etc.

(7) Mixtures of (1) to (6)

In the present invention, the ceramic powder and the metal powder exhibit their effect irrespective of their particle size, but powders having an average particle size of not more than 100 microns are especially effective. From the viewpoint of the homogeneity of the resulting molded article, it is preferred to apply the invention to powders having an average particle size of not more than 40 microns.

The composition of this invention comprises 100 parts by weight of the ceramic powder and/or the metallic powder, and 5 to 40 parts by weight, especially 10 to 30 parts by weight, of the polyalkylene carbonate.

Various additives incorporated in ordinary ceramic compositions, such as plasticizers, lubricants, wetting agents, peptizing agents, antistatic agents, chelating agents, blowing agents and surface-active agents, may be added in this invention within a range not detrimental to the purpose of the invention. Binders other than the polymeric binder used in this invention may be used together. In some cases, water may also be used in combination. Examples of such additives are plasticizers, lubricants and other binders which can be used in combination. The plasticizers include phthalates such as diethyl phthalate, dibutyl phthalate, dioctyl phthalate, butyl benzyl phthalate and butyl octyl phthalate; adipates; sebacates; and azelates. The lubricants include fatty acids such as lauric acid, myristic acid, palmitic acid, stearic acid, arachidic acid and behenic acid, esters and metal salts of these fatty acids, hydrocarbon waxes such as paraffin wax, microwax and polyethylene wax having a low degree of polymerization, aliphatic alcohols such as cetyl alcohol and stearyl alcohol and natural waxes. The binders that can be used in combination include polyethylene, polypropylene, polybutene, polymethyl (meth)acrylate, polystyrene, an ethylene/vinyl acetate copolymer, and lower-molecular-weight compounds of these. The joint use of the plasticizer and/or the lubricant is preferred because it improves flowability. Preferably, they are incorporated each in an amount of up to 5 parts by weight per 100 parts by weight of the ceramic powder and/or the metal powder. The amount of the other synthetic resin binder, when used, is up to 40 parts by weight, particularly up to 30 parts by weight.

Best Mode of Practicing the Invention

The contents of the present invention will be illustrated below by suitable examples. Unless otherwise specified, the present invention is not to be limited to these examples.

EXAMPLE 1

One hundred parts by weight of an alumina powder (average particle diameter 0.6 micron) as a ceramic powder, 25 parts of polyethylene carbonate (Mn 41000), 2 parts by weight of dioctyl phthalate and 2 parts by weight of stearate were mixed and kneaded in a pressurizing-type kneader at 140° C. for 1 hour. The kneaded mixture was crushed to small fragments having a diameter of 3 to 5 mm.

The small fragments were molded by a commercial injection molding machine at a temperature of 150° C. and a mold temperature of 50° C. under an injection pressure of 1000 kg/cm$^2$ to form a plate-like test specimen, 5 mm thick, 10 mm wide and 50 mm long.

The specimen was heated for a period of about 53 hours in an electrical furnace in an air atmosphere by elevating the temperature from room temperature to 100° C. at a rate of 30° C./hour and from 100° to 350° C. at a rate of 5° C./hour to dewax the specimen.

The molded specimen after dewaxing was not deformed, nor was there observed cracking or swelling.

EXAMPLE 2

One hundred parts by weight of the same alumina powder as used in Example 1, 25 parts by weight of polypropylene carbonate (Mn 21500), 2.5 parts by weight of dioctyl phthalate and 2.5 parts by weight of stearic acid were mixed and kneaded in a pressurizing-type kneader at 150° C. for 1 hour. The resulting kneaded mixture was crushed into small fragments having a diameter of 3 to 5 mm.

The kneaded mixture was molded as in Example 1 except that the molding temperature was changed to 160° C.

The resulting test specimen was heated for about 51 hours in an electrical furnace in an air atmosphere by elevating the temperature from room temperature to 110° C. at a rate of 30° C./hour and from 110 to 350° C. at a rate of 5° C./hour to dewax it.

The molded specimen after dewaxing was not deformed, nor was there observed cracking or swelling.

EXAMPLE 3

A test specimen was obtained by injection molding in the same manner as in Example 1 except that 100 parts by weight of the same alumina powder as used in Example 1, 12 parts by weight of polyethylene carbonate, 8 parts by weight of an ethylene/vinyl acetate copolymer, 2 parts by weight of dioctyl phthalate and 2 parts by weight of stearic acid were mixed.

The resulting molded specimen was heated for about 66 hours in an electrical furnace in an air atmosphere by elevating the temperature from room temperature to 80° C. at a rate of 30° C./hour and from 80 to 400° C. at a rate of 5° C./hour to dewax it. The molded specimen after dewaxing did not show cracking nor swelling.

EXAMPLE 4

One hundred parts by weight of a silicon carbide powder (average particle diameter 0.4 micron) as a ceramic powder, 15 parts by weight of polyethylene carbonate, 10 parts by weight of polystyrene, 2 parts by weight of dioctyl phthalate and 2 parts by weight of stearic acid were mixed and kneaded.

The kneaded mixture was injection-molded as in Example 1. Dewaxing of the molded article was carried out in a nitrogen atmosphere in accordance with the same temperature elevation pattern as in Example 3.

The molded article after dewaxing was not deformed, nor was there observed cracking or swelling.

EXAMPLE 5

One hundred parts by weight of the same alumina powder as used in Example 1 as a ceramic powder and 25 parts by weight of polyethylene carbonate were mixed and kneaded under heat. The resulting kneaded mixture was molded into a round bar having a diameter of 8 mm by using an extruder at 150° C.

The molded article was cut to a length of 100 mm and dewaxed under the same conditions as in Example 1.

The molded article after dewaxing was not deformed, nor was there observed cracking or swelling.

COMPARATIVE EXAMPLE 1

One hundred parts by weight of the same alumina powder as used in Example 1 as a ceramic powder and 16 parts by weight of an ethylene/vinyl acetate copolymer were kneaded under heat in accordance with Example 1. The kneaded mixture was injection-molded, and the resulting test specimen was dewaxed in an electrical furnace in an air atmosphere for about 162 hours by elevating the temperature from room temperature to 80° C. at a rate of 30° C./hour and from 80 to 400° C. at a rate of 2° C./hour.

In spite of the fact that the dewaxing time was made longer than in Example 1, cracking or swelling was observed in the molded article after dewaxing.

COMPARATIVE EXAMPLE 2

One hundred parts by weight of the same alumina powder as used in Example 1 as a ceramic powder, 16 parts by weight of an ethylene/vinyl acetate copolymer, 2 parts by weight of dioctyl phthalate and 2 parts by weight of stearic acid were mixed and kneaded under heat. The kneaded mixture was injection-molded as in Example 1, and the resulting test specimen was dewaxed. Distortion occurred in the molded article, and cracking and swelling were also observed.

Possibility of Utilization in Industry

The ceramic-making composition of this invention shows the following functional effects.

(1) The polyalkylene carbonate decomposes very rapidly within a low temperature range, and the decomposition gases (composed mainly of carbon dioxide gas and water) are nontoxic.

(2) The ceramic article after thermal decomposition does not develop surface cracking and swelling.

(3) The kneadability of the composition is good.

As a result, when the composition is used in plastic forming such as injection molding or extrusion, the time required for the dewaxing step is shortened and the productivity increases.

We claim:

1. A ceramic-making composition comprising at least one starting powder selected from the group consisting of powders of metals, powders of metal oxides, powders of metal carbides, powders of metal nitrites and powders of metal borides, and a binder wherein the binder comprises polyalkylene carbonate and the binder is present in amounts up to 40 parts by weight, per 100 parts by weight of the starting powder, and which further comprises a plasticizer and/or a lubricant.

2. The ceramic-making composition set forth in claim 1 which further comprises dioctyl phthalate and stearic acid and in which the starting powder is an alumina powder or a silicon carbide powder, and the polyalkylene carbonate is polyethylene carbonate or polypropylene carbonate.

3. The ceramic-making composition set forth in claim 1 which further comprises dioctyl phthalate and stearic acid and in which the starting powder is an alumina powder or a silicon carbide powder, and the polyalkylene carbonate is polyethylene carbonate or polypropylene carbonate.

4. The ceramic-making composition set forth in claim 1 in which 5 to 40 parts by weight of the alkylene carbonate and up to 5 parts by weight each of the plasticizer and/or the lubricant are incorporated per 100 parts by weight of the starting powder.

5. The ceramic-making composition set forth in claim 1 in which 10 to 30 parts by weight of the polyalkylene carbonate and up to 5 parts by weight each of the plasticizer and/or the lubricant are incorporated per 100 parts by weight of the starting powder.

6. The ceramic-making composition set forth in claim 1 which further comprises another synthetic resin binder in addition to the polyalkylene carbonate.

7. The ceramic-making composition set forth in claim 6 which further comprises at least one other synthetic resin selected from the group consisting of polyethylene, polypropylene, polymethyl (meth)acrylate, polystyrene and an ethylene/vinyl acetate copolymer and in which the starting powder is a powder of a metal oxide or a powder of a metal carbonate and the polyalkylene carbonate is a polyalkylene carbonate in which each alkylene group contains 2 to 6 carbon atoms.

8. The ceramic-making composition set forth in claim 6 which comprises at least one plasticizer selected from phthalates and/or a lubricant selected from the group consisting of fatty acids, esters and metal salts of the fatty acids and hydrocarbon waxes and in which the starting powder is a powder of a metal oxide or a powder of a metal carbonate and the polyalkylene carbonate is a polyalkylene carbonate in which each alkylene group contains 2 to 6 carbon atoms.

9. The ceramic-making composition set forth in claim 6 which further comprises at least one other synthetic resin selected from the group consisting of polyethylene, polypropylene, polymethyl (meth)acrylate, polystyrene and an ethylene/vinyl acetate copolymer and at least one plasticizer selected from the group consisting of diethyl phthalate and dioctyl phthalate and/or a lubricant selected from the group consisting of lauric acid, myristic acid, palmitic acid, stearic acid, esters and metal salts of these acids and hydrocarbon waxes and in which the starting powder is a powder of a metal oxide or a powder of a metal carbonate and the polyalkylene carbonate is a polyalkylene carbonate in which each alkylene group contains 2 to 6 carbon atoms.

10. The ceramic-making composition set forth in claim 6 which further comprises polystyrene or an ethylene/vinyl acetate copolymer, dioctyl phthalate, and stearic acid and in which the starting powder is an alumina powder or a silicon carbide powder, and the polyalkylene carbonate is polyethylene carbonate or polypropylene carbonate.

11. The ceramic-making composition set forth in claim 6 in which 5 to 40 parts by weight of the alkylene carbonate, up to 40 parts by weight of the other synthetic resin and up to 5 parts by weight each of the plasticizer and/or the lubricant are incorporated per 100 parts by weight of the starting powder.

12. The ceramic-making composition set forth in claim 6 in which 10 to 30 parts by weight of the polyalkylene carbonate, up to 30 parts by weight of the other synthetic resin and up to 5 parts by weight each of the plasticizer and/or the lubricant are incorporated per 100 parts by weight of the starting powder.

* * * * *